July 19, 1938.  G. A. ELLESTAD ET AL  2,124,344
OPHTHALMOSCOPE
Filed June 1, 1936
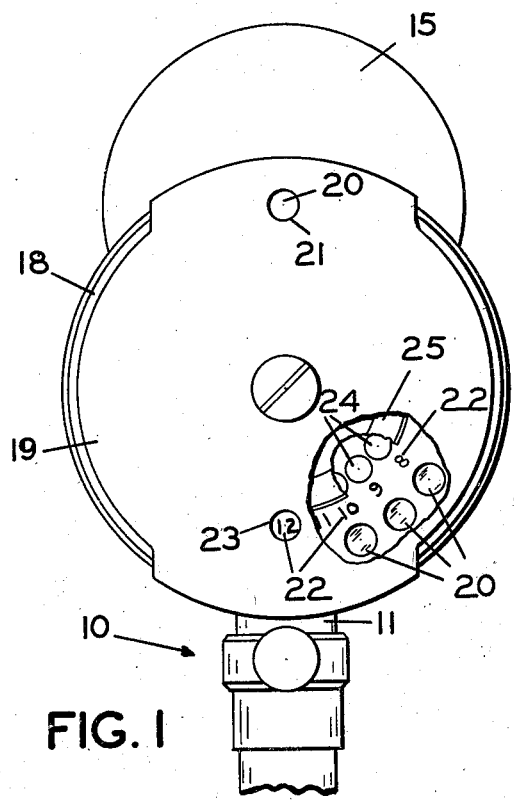
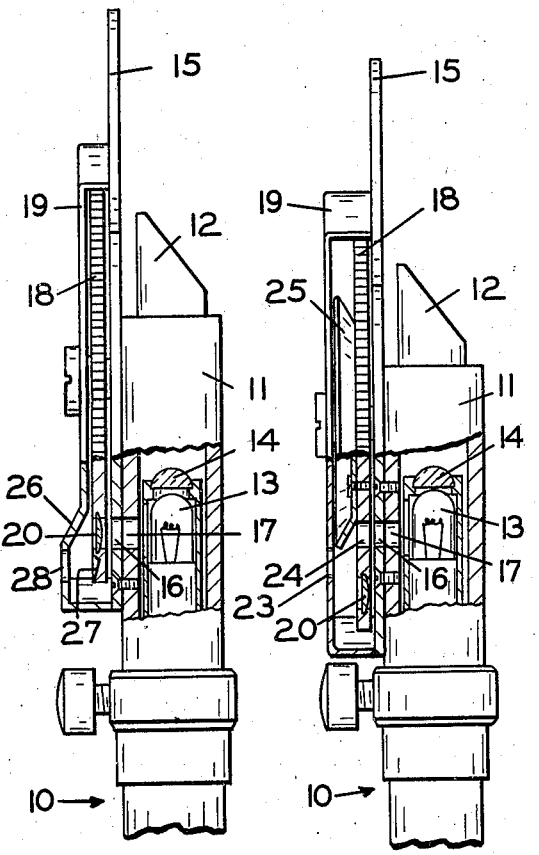
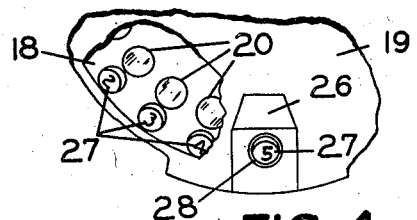
GERHARD A. ELLESTAD
FREDERICK W. JOBE
INVENTORS
BY
ATTORNEYS Patented July 19, 1938

2,124,344

UNITED STATES PATENT OFFICE 2,124,344

OPHTHALMOSCOPE

Gerhard A. Ellestad and Frederick W. Jobe, Rochester, N. Y., assignors to Bausch & Lomb Optical Company, Rochester, N. Y., a corporation of New York Application June 1, 1936, Serial No. 82,810

3 Claims. (Cl. 88—22)

The present invention relates to optical instruments and more particularly to ophthalmoscopes which are used in darkened rooms for examining the eyes.

One of the objects of the present invention is to provide an improved ophthalmoscope which will be relatively simple in structure yet convenient and efficient in operation. Another object is to provide an ophthalmoscope having means for illuminating its dial in a simple yet efficient manner. These and other objects and advantages reside in certain novel features of construction, arrangement and combination of parts.

Referring to the drawing:

Fig. 1 is a front view with parts broken away, of an ophthalmoscope head embodying our invention.

Fig. 2 is a side elevation thereof with parts in section.

Fig. 3 is a side elevation with parts in section, of a modified form of our invention.

Fig. 4 is a fragmentary front view thereof.

One embodiment of the present invention is illustrated in Figs. 1 and 2 wherein 10 indicates generally an ophthalmoscope head which is of the well known May type. This ophthalmoscope head comprises a tubular casing 11 carrying a mounting 12 which holds a reflecting prism, not shown. An incandescent lamp 13 is mounted within the casing 11 and directs light rays through the lens 14 onto a prism, not shown, from whence they pass into the eye of a patient, as is well known to those skilled in the art. Secured to the casing 11 is a shield plate 15 having an opening 16 in register with an opening 17 in the wall of the casing 11. The lens carrying disk 18 is rotatably mounted on the plate 15.

A cover plate 19 partially encloses the edge of the disk 18 so that the edge of the disk 18 may be engaged by the finger for the purpose of selectively rotating the disk to place any one of a series of lenses 20 in operative relation to the sight opening 21. Indicia, such as 22, are stamped on the disk 18 and are so positioned that the power of the lens 20 in operative relation to the sight opening 21 is indicated at the opening 23 in cover plate 19. The disk 18 is provided with a series of apertures 24 which are circularly arranged adjacent the indicia 22. The apertures 24 are so positioned that they are brought into registry with the openings 16 and 17, as shown in Fig. 2, so that light rays from the lamp 13 may pass through the aligned openings. A frusto-conical reflecting member 25 is secured to the disk 18 so that it overlies the apertures 24 and the light from the lamp 13 is thus directed onto the neighboring indicia 22. The face of the member 25 is preferably coated with white paint or lacquer to enhance its reflecting properties.

In the embodiment shown in Figs. 3 and 4, the openings 16 and 17 are so located that the light from the lamp 13 passes through the openings 16 and 17 and thence through one of the lenses 20. In alignment with this lens 20, the cover plate 19 has a struck-up portion 26. The indicia 27 is located near the lenses 20 and an opening 28 in the cover plate 19 permits observation of the indicia 27. The inner surface of the struck-up portion 26 is preferably coated with white paint or lacquer so as to reflect the light from the lamp 13 onto the indicia 27.

From the foregoing it will be apparent that we are able to attain the objects of our invention and provide an ophthalmoscope having an improved means for illuminating the lens indicia on the observer's side of the lens disk. Various modifications can, of course, be made without departing from the spirit of our invention or the scope of the appended claims.

We claim:

1. In an ophthalmoscope, a casing, a lamp within said casing, a lens disk rotatably mounted on said casing, a series of lenses carried by said disk, a series of indexes carried by said disk on the side remote from said casing for designating the particular lens used, an opening in said casing adjacent said disk, a series of openings through said disk, one for each lens and index, said openings being so positioned in said disk as to move into alignment with the opening in said casing as the disk is moved to select different lenses, and reflecting means carried by said disk for directing light passing from said lamp through said openings to said indexes.

2. In an ophthalmoscope having means for illuminating the eye of a patient and sighting means through which the eye may be observed, the combination of a casing having an opening, a light source within the casing, a disk rotatably carried by said casing, a series of lenses carried by said disk and movable into alignment with said sighting means, indexes carried by said disk on the side remote from said casing to designate the lens in alignment with said sighting means, said disk having an opening adjacent each index movable into alignment with the opening in said casing, and means on said disk for directing onto said indexes light rays which pass through said openings from said source.

3. In an ophthalmoscope having means for illuminating the eye of a patient and sighting means through which the eye may be observed, the combination of a casing having an opening, a light source within the casing, a disk rotatably carried by said casing, a series of lenses carried by said disk and movable into alignment with said sighting means, indexes carried by said disk on the side remote from said casing to designate the lens in alignment with said sighting means, said disk having an opening adjacent each index movable into alignment with the opening in said casing, and means on said disk for directing onto said indexes light rays which pass through said openings from said source, said last-named means comprising an annular reflector secured to said disk and extending behind all of the openings in said disk.

GERHARD A. ELLESTAD.
FREDERICK W. JOBE.